United States Patent [19]

Balchunas

[11] 3,813,641

[45] May 28, 1974

[54] ELECTRIC CONNECTING MECHANISM

[75] Inventor: Charles A. Balchunas, Hopkinton, Mass.

[73] Assignee: General Electric Company, Bridgeport, Conn.

[22] Filed: Feb. 12, 1973

[21] Appl. No.: 331,762

Related U.S. Application Data

[62] Division of Ser. No. 260,759, June 8, 1972, Pat. No. 3,754,107.

[52] U.S. Cl. ............................ 339/170, 339/210 R
[51] Int. Cl. ............................................ H01r 13/50
[58] Field of Search .......... 339/154, 156, 157, 159, 339/170, 210

[56] References Cited
UNITED STATES PATENTS

| | | | |
|---|---|---|---|
| 2,915,736 | 12/1959 | Smith et al. | 339/210 R X |
| 3,629,789 | 12/1971 | Szeremy | 339/170 X |

FOREIGN PATENTS OR APPLICATIONS

| | | | |
|---|---|---|---|
| 218,906 | 3/1957 | Australia | 339/156 R |

*Primary Examiner*—Bobby R. Gay
*Assistant Examiner*—Lawrence J. Staab
*Attorney, Agent, or Firm*—Leonard J. Platt; John F. Cullen; George R. Powers

[57] ABSTRACT

An electrical connecting mechanism wherein a pair of shouldered prongs are uniquely mounted in a housing for connecting the mechanism to a conventional wall mounted outlet box. The construction includes shoulders on the prongs which are sandwiched between bosses which are formed on a rear casing and a front cover of the housing. Electrical outlet receptable spring contacts are placed over the wall prongs in the vicinity of the wall prongs so that the wall prongs, and the receptacle spring contacts, are reliably connected to each other and positioned within the housing with the use of relatively few parts.

2 Claims, 6 Drawing Figures

ELECTRICAL CONNECTING MECHANISM

This is a division, of application Ser. No. 260,759, filed June 8, 1972, now U.S. Pat. No. 3,754,107.

BACKGROUND OF THE INVENTION

This invention relates to an electrical connecting mechanism, and more particularly to an improved construction for mounting and housing the inlet prongs, electrical outlet receptacle spring contacts, electric motor and other components of an electrical connecting mechanism.

With a conventional wall plug-in timer a plastic housing is usually provided for enclosing an electric motor for driving a 24-hour time wheel which is rotatably mounted at the front of the housing. A pair of inlet prongs extend rearwardly from the housing for connecting the time switch to a conventional electrical outlet box, and a pair of receptacle slots are usually formed in the front portion of the housing for permitting a device to be controlled, such as an electric coffeemaker or lamp, to be plugged into the receptacle slots. Naturally, contact springs are positioned immediately below the receptacle slots for making appropriate contact with the electrical plug of the coffeemaker or lamp to be controlled. Such timers also conventionally include electrical wiring between the inlet prongs, the electric motor, switch contacts, and the electric outlet receptacle contacts. My invention is concerned with such a wall plug-in timer, and more particularly to a unique arrangement for locating and mounting the inlet prongs, and receptacle spring contacts, with the use of relatively few parts which may be readily and reliably connected to each other.

SUMMARY OF THE INVENTION

Accordingly, it is a primary object of this invention to provide an improved electrical connecting mechanism which may be inexpensively manufactured with the use of relatively few parts.

In accordance with one of the aspects of this invention a rear casing is formed with an inwardly projecting boss which is formed of plastic or other suitable electrical insulating material. A pair of slots are formed in the boss and a pair of shouldered inlet prongs are inserted within the slots. The shoulders on the inlet prongs extend outwardly away from each other and are positioned against an inner surface of the boss. Terminal portions of the inlet prongs extend inwardly away from the surface of the boss. A complementary boss is formed on a front cover of the housing for sandwiching the shoulders of the inlet prongs between the boss on the rear casing and the boss on the front cover. A pair of slots are formed in the front cover and a pair of receptacle spring contacts are positioned in the housing behind the slots in the cover. With this construction, the inlet prongs are securely held in a housing, and a pair of receptacle spring contacts may be readily connected to the inlet prongs. Thus, a very simple yet effective and reliable electrical connecting mechanism has been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
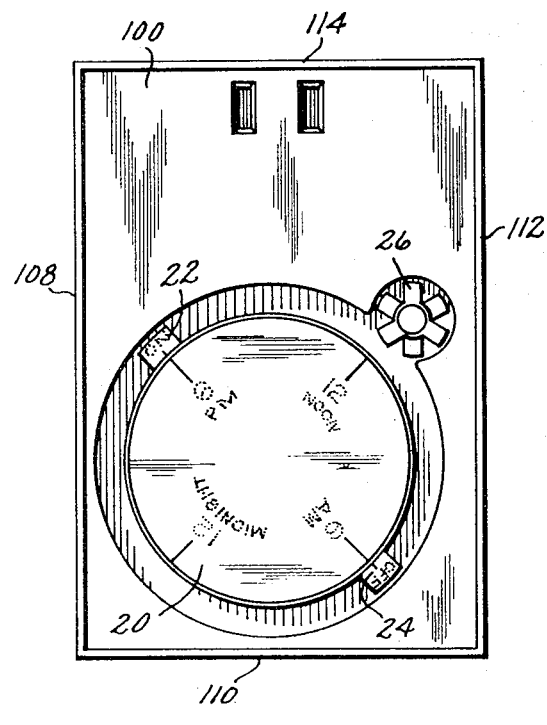
FIG. 1 is a front elevational view of a time switch constructed in accordance with my invention.
Figure 2:
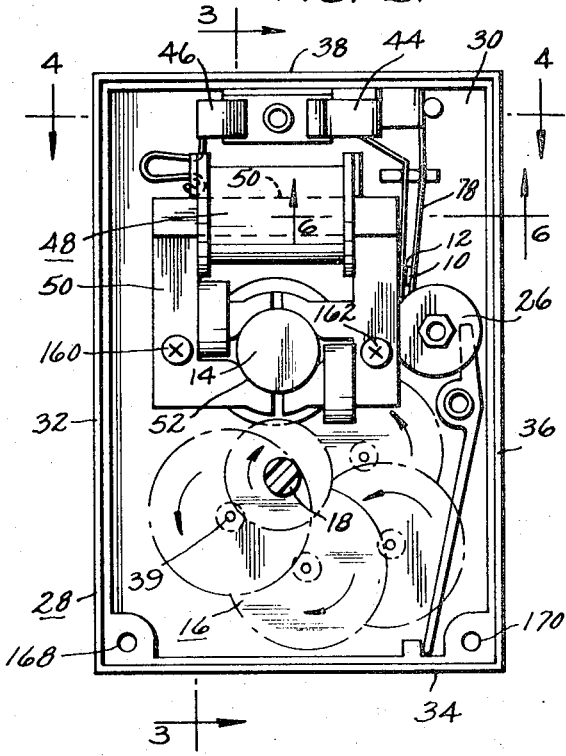
FIG. 2 is a front elevational view of the time switch illustrated in FIG. 1 with a front cover of the time switch removed for purposes of illustration.

Referring now to the drawing and first particularly to FIGS. 1 and 2, there is shown a wall mounted time switch constructed in accordance with my invention. The time switch includes a pair of switch contacts 10 and 12 for controlling the operation of an electric coffeemaker, lamp, or similar appliance, and a synchronous electric motor 14 is provided for operating the switch contacts 10 and 12 at the preset times. As illustrated more particularly in FIGS. 2 and 3, the motor 14 drives a gear reduction unit 16 which in turn rotates a shaft 18.

Figure 3:
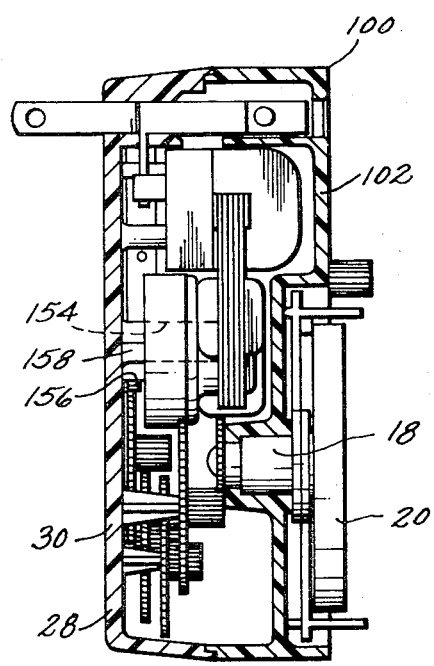
FIG. 3 is a cross-sectional view of the time switch illustrated in FIG. 1 taken along the line 3—3 of FIG. 2.

With particular reference to FIGS. 1 and 3, the shaft 18 carries a 24-hour dial 20 which carries ON and OFF trip levers 22 and 24, respectively. The positions of the ON and OFF trip levers on the 24-hour dial 20 may be manually set by a user of the time switch to turn an appliance on and off at the desired times, and thus, the dial 20 drives the trip levers 22 and 24, and at the appropriate times the trip levers actuate a switch operating mechanism 26 to open and close the switch contacts 10 and 12 at the preset times.

In carrying out the object of my invention the entire rear casing of the time switch is made from a single molded member 28 which includes a rear panel 30 and forwardly extending side wall portions 32 and 36, a top wall 38 and a bottom wall 34. Forwardly extending studs 39 are also integrally formed with the rear casing for mounting the electric motor 14, the reduction gearing 16, and the other components of the time switch.

In accordance with my invention a pair of shouldered inlet prongs 40 and 42 are uniquely formed and located with respect to a pair of outlet receptacle springs 44 and 46 and the electric motor 14 for enabling these parts to be effectively and reliably connected to each other with the use of relatively few parts. To achieve this the outlet receptacle springs 44 and 46 which are provided for making contact with a plug of the appliance to be controlled are positioned just forwardly of the inlet prongs 40 and 42 which are arranged to be plugged into any conventional wall mounted outlet box. The conventional synchronous electric motor 14 includes an electrical coil 48 which surrounds the usual field laminations 50 for driving a rotor which is positioned within a casing portion 52. Conventionally, input electrical terminals 54 and 56 are positioned at opposite sides of the motor coil 48, and thus, as shown, the motor coil terminals 54 and 56 are located closely adjacent to a respective inlet prong 40 or 42 and a respective outlet receptacle spring 44 or 46.

Figure 5:
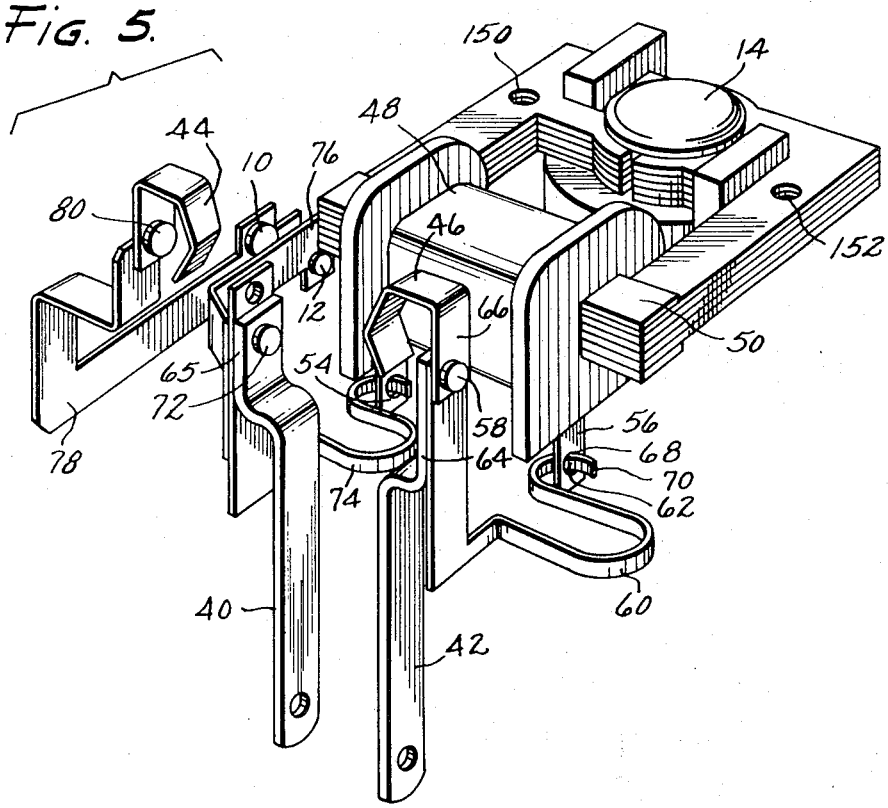
FIG. 5 is an exploded perspective view of the inlet prongs, outlet receptacle springs, electric motor and switch of the time switch illustrated in FIG. 1.
Figure 6:
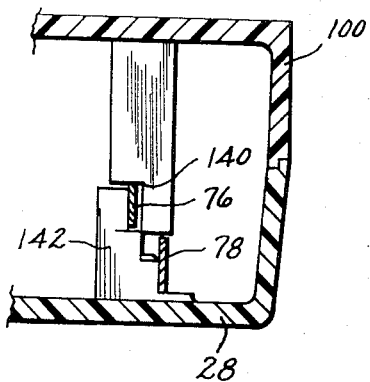
FIG. 6 is a fragmentary cross-sectional view of the time switch illustrated in FIG. 1 taken along the line 6—6 of FIG. 2.

As shown more particularly in FIG. 5, a rivet 58, a stamped sheet metal piece 60 and a piece of solder 62 is all that is required for connecting the inlet prong 42 to the outlet receptacle spring contact 46 and one of the motor terminals 56. As shown, the rivet 58 extends through an inner forwardly extending terminal portion 64 of inlet prong 42, a forward portion of a sheet metal connector 60 and an outer portion 66 of the receptacle spring contact 46. An aperture 68 is formed in the terminal 56 of the motor coil and a reduced portion 70 of the sheet metal terminal 60 extends through the aperture and is held therein by a drop of solder 62. A generally similar arrangement is provided for connecting the inlet prong 40 to the other terminal 54 of the motor coil 48, and as illustrated in FIG. 5, a rivet 72 extends through the inlet prong 40 and a sheet metal strip 74. The connection is completed by attaching the strip 74 to terminal 54.

With the construction thus far described, most of the components illustrated in FIG. 5 including the inlet prongs 40 and 42, and the receptacle spring contact 46 may be readily connected and subassembled to each other and held generally in the position illustrated in FIG. 5. A unique simple arrangement is provided for rigidly holding these parts in their assembled position within the time switch casing. As shown more particularly in FIG. 4, a forwardly extending boss 82 is integrally formed with the rear panel 30 and is provided with two through slots 84 and 86 for receiving the inlet prongs 40 and 42. As shown, the inlet prongs 40 and 42 are provided with outwardly extending shoulders 88 and 90 for abutting a forward surface 92 of the boss and also for spacing the forwardly extending terminal portions 64 and 65 of the inlet prongs outwardly away from the end portions 94 and 96 of the receptacle springs 44 and 46, respectively, so as to leave sufficient room for the inlet prongs of an appliance inlet plug which may be connected to the receptacle spring contacts 44 and 46.

A front cover 100 of the time switch housing is also integrally formed of molded plastic material and is provided with parts that are complementary to the parts of the rear casing for mounting the electric motor 14, the reduction gearing 16, the inlet prongs 40 and 42, and the other parts of my unique time switch. As illustrated more particularly in FIGS. 3 and 4, the front cover includes a front panel portion 102 for supporting a shaft 18, and the 24-hour dial 20. Two integrally formed slots 104 and 106 are positioned immediately above their respective receptacle spring contacts 44 and 46. Rearwardly extending wall portions 108, 110, 112 and 114 of the front cover are arranged to be complementary with the forwardly extending wall portions 32, 34, 36 and 38 of the rear casing.

The front cover 100 also includes a rearwardly extending enlarged boss 116 which is positioned opposite to the forwardly extending boss 82 of the rear casing. With this arrangement, as shown more particularly in FIG. 4, a spacer member 118 formed of suitable electrical insulating material is sandwiched between the rearwardly extending boss 116 and the shoulders 88 and 90 of the inlet prongs for securely holding the inlet prongs 40 and 42 in their assembled positions. As shown, a screw 120 or other suitable connecting means may be readily inserted through an aperture 122 formed in the forwardly extending boss 82 through an aperture 124 formed in the insulating member 118 and into the rearwardly extending boss 116. Thus, the parts are securely held to each other in their desired operating relationship, and the prongs 40 and 42 cannot be inadvertently pushed further into the housing when they are inserted into a wall outlet.

Figure 4:
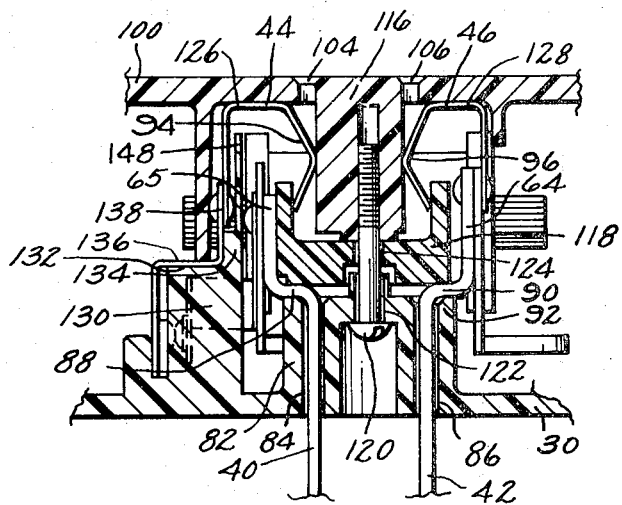
FIG. 4 is a fragmentary cross-sectional view taken along the line 4—4 of FIG. 2.

With particular reference to FIG. 4, it can also be appreciated that the receptacle springs 44 and 46 include forward portions 126 and 128 which are located in abutting relationship with the inner surface of the front wall 102 and end portions 94 and 96 which are normally in abutting relationship with the sides of the rearwardly extending boss 116. Thus, the receptacle springs are suitably guided for appropriate motion within the time switch as inlet prongs of a plug of an appliance to be controlled are moved into and out of the slots 104 and 106. The receptacle springs 44 and 46 are reliably guided so that they cannot be forced to any undesired position where they might be damaged, and thus, reduce the useful life of my time switch.

From the foregoing description it can be appreciated that the parts may be readily connected to each other by first constructing the subassembly illustrated in FIG. 5 and then sliding the inlet prongs 40 and 42 outwardly through their respective slots 84 and 86 which are formed in the rear casing. During this insertion apertures 150 and 152 which may be formed in the motor field laminations are aligned with apertures which are formed in the rear casing spacer posts 154, and an output pinion 156 of the motor may be inserted within its plastic guide 158 which is integrally formed with the rear casing of the time switch. Suitable screws 160 and 162 may be provided for attaching the motor field laminations and the motor to the rear casing of the time switch.

The next convenient step in the assembly of the time switch is to place the receptacle spring 44 and its switch blade 78 on the steps 132 and 134 which are integrally formed with the rear casing. The assembly may be readily completed by placing the front cover over rear casing, and carefully positioning the rearwardly extending boss 116 between receptacle springs 44 and 46. Then a screw 120 may be inserted through the aperture 122 formed in the rear casing boss 82 and threaded into the boss 116 which is formed on the front cover. Additional screws may be inserted in the apertures 168 and 170 which are formed at the lower corners of the rear casing of the time switch.

From the foregoing discussion, it can be appreciated that my unique inlet prongs, and outlet receptacle spring contacts, may be readily assembled and reliably housed within a housing with the use of relatively few parts. Thus, an exceedingly simply yet reliable electrical connecting mechanism construction has been achieved.

What I claim is:

1. An electrical connecting mechanism comprising:

a. a housing formed of electric insulating material including a rear casing and a front cover;
   b. a forwardly extending boss formed in said rear casing, said boss including a pair of slots extending therethrough, an inner front surface positioned between said slots and a pair of inner front surfaces extending transversely away from said slots;
   c. a pair of inlet prongs, each of said inlet prongs including an elongated portion extending rearwardly through one of the slots, an elongated portion extending forwardly from said boss within the housing and arranged generally parallel to the rearwardly extending portion, and a shouldered portion extending transversely outwardly from the slots and generally perpendicular to the rearwardly extending portion and the forwardly extending portion, the shouldered portion of each of said inlet prongs being in abutting relationship with one of the transverse inner front surfaces of said boss that extends transversely away from said slots;

d. an insulating member having a generally flat surface which is greater than the distance between said slots for engaging and holding the transversely outwardly extending shoulders of said inlet prongs;

e. a boss formed in said front cover having a rear surface for sandwiching the insulating member and the shoulders of said inlet prongs between the bosses formed on said rear casing and said front cover for securely holding said inlet prongs on said housing;

f. a pair of slots formed in said front cover; and g. a pair of receptacle spring contacts positioned in said housing behind the slots formed in the front cover.

2. An electrical connecting mechanism as defined in claim 1 wherein one of said receptacle spring contacts includes a rearwardly extending portion arranged generally parallel to a forwardly extending portion of one of said inlet prongs and is connected to said forwardly extending portion of said one of said inlet prongs for readily holding the receptacle spring contact within the housing.

* * * * *